(12) United States Patent
Thiruchengode Vajravel et al.

(10) Patent No.: US 11,983,123 B2
(45) Date of Patent: May 14, 2024

(54) SYSTEMS AND METHODS FOR SELECTING AND CONFIGURING GROUPED PERIPHERALS IN SHARED WORKSPACES

(71) Applicant: Dell Products, L.P., Round Rock, TX (US)

(72) Inventors: Gokul Thiruchengode Vajravel, Bangalore (IN); Vivekanandh Narayanasamy Rajagopalan, Bangalore (IN); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/661,568

(22) Filed: May 2, 2022

(65) Prior Publication Data

US 2023/0350816 A1 Nov. 2, 2023

(51) Int. Cl.
*G06F 13/10* (2006.01)
(52) U.S. Cl.
CPC .......... *G06F 13/10* (2013.01); *G06F 2213/40* (2013.01)
(58) Field of Classification Search
CPC .......... G16Z 99/00; H04W 4/02; H04W 4/21
See application file for complete search history.

(56) References Cited

U.S. PATENT DOCUMENTS

| 11,296,971 | B1* | 4/2022 | Jain | H04L 41/12 |
| 2010/0325559 | A1* | 12/2010 | Westerinen | G06F 3/04847 715/753 |
| 2016/0105359 | A1* | 4/2016 | Kim | H04L 45/14 370/252 |
| 2020/0023277 | A1* | 1/2020 | Chow | A63F 13/798 |
| 2021/0096698 | A1* | 4/2021 | Weber | G06F 3/04883 |

* cited by examiner

*Primary Examiner* — Getente A Yimer
(74) *Attorney, Agent, or Firm* — Fogarty LLP (57) ABSTRACT

Embodiments of systems and methods for selecting and configuring grouped peripherals in shared workspaces are described. In an illustrative, non-limiting embodiment, an IHS may include a processor and a memory coupled to the processor, the memory having program instructions stored thereon that, upon execution by the processor, cause the IHS to: group a plurality of devices available during a shared workspace session into a plurality of groups; transmit, to a remote service: (a) an indication of a performance metric, and (b) an indication of the plurality of groups; and receive, from the remote service, a selection of one device in each of the plurality of groups for use during the shared workspace session based, at least in part, upon the performance metric.

20 Claims, 4 Drawing Sheets

SYSTEMS AND METHODS FOR SELECTING AND CONFIGURING GROUPED PERIPHERALS IN SHARED WORKSPACES

FIELD

This disclosure relates generally to Information Handling Systems (IHSs), and more specifically, to systems and methods for selecting and configuring grouped peripherals in shared workspaces.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for selecting and configuring grouped peripherals in shared workspaces are described. In an illustrative, non-limiting embodiment, an IHS may include: a processor and a memory coupled to the processor, the memory having program instructions stored thereon that, upon execution by the processor, cause the IHS to: group a plurality of devices available during a shared workspace session into a plurality of groups; transmit, to a remote service: (a) an indication of a performance metric, and (b) an indication of the plurality of groups; and receive, from the remote service, a selection of one device in each of the plurality of groups for use during the shared workspace session based, at least in part, upon the performance metric.

The plurality of devices may include at least one of: a set of two or more cameras, a set of two or more displays, a set of two or more keyboards, a set of two or more mice, or a set of two or more audio devices. Additionally, or alternatively, the plurality of devices may include a first set of peripheral devices integrated into the IHS and a second set of external peripheral devices disposed in an individual shared workspace where the IHS is located.

The individual shared workspace may include a desk, cubicle, room, an office, or a home. Each of the plurality of groups may include two or more devices that belong to a same Operating System (OS) device class. The performance metric may include at least one of: a current processing load, a current memory load, a current battery level, a current power consumption, a current thermal characteristic, or a current connectivity metric.

The remote service may be configured to select the one device in each of the plurality of groups based, at least in part, upon: (i) a number of groups in the plurality of groups; (ii) a list of the plurality of devices; (iii) a number of devices in each of the plurality of groups; (iv) a value of each device in each of the plurality of groups; (v) a weight of each device in each of the plurality of groups; and (vii) a maximum collective weight limit for all selected devices.

Each weight may include a measure of how a respective device affects the performance metric. Each value may be proportional to a number of features or quality of features of a respective device.

The program instructions, upon execution, may cause the IHS to: determine that the plurality of devices available during the shared workspace session has changed; transmit, to the remote service, an indication of the change; and receive, from the remote service, a selection of at least one other device in at least one of the plurality of groups for use during the shared workspace session based, at least in part, upon the change. Additionally, or alternatively, the program instructions, upon execution, may cause the IHS to: determine that the performance metric has changed; transmit, to the remote service, an indication of the change; and receive, from the remote service, a selection of at least one other device in at least one of the plurality of groups for use during the shared workspace session based, at least in part, upon the change. Additionally, or alternatively, the program instructions, upon execution, may cause the IHS to: determine that an application executed during the shared workspace session has changed; transmit, to the remote service, an indication of the change; and receive, from the remote service, a selection of at least one other device in at least one of the plurality of groups for use during the shared workspace session based, at least in part, upon the change.

In another illustrative, non-limiting embodiment, a method may include receiving, at a remote service from an IHS, an indication of a current IHS performance metric and an indication of a plurality of groups of devices available to the IHS during a shared workspace session; and transmitting, from the remote service to the IHS, a selection of one device in each of the plurality of groups for use during the shared workspace session based, at least in part, upon the current IHS performance metric.

The method may also include: receiving, at the remote service from the IHS, an indication that the plurality of devices available during the shared workspace session has changed; and transmitting, from the remote service to the IHS, a selection of at least one other device in at least one of the plurality of groups for use during the shared workspace session based, at least in part, upon the change.

The method may further include: receiving, at the remote service from the IHS, an indication that an application executed during the shared workspace session has changed; and transmitting, from the remote service to the IHS, a selection of at least one other device in at least one of the plurality of groups for use during the shared workspace session based, at least in part, upon the change. The method may further include: receiving, at the remote service from the IHS, an indication that the IHS performance metric has changed; and transmitting, from the remote service to the IHS, a selection of at least one other device in at least one of the plurality of groups for use during the shared workspace session based, at least in part, upon the change.

In yet another illustrative, non-limiting embodiment, a hardware memory device may have program instructions stored thereon that, upon execution by a processor of an IHS, cause the IHS to: group a plurality of devices coupled to the IHS into a plurality of groups; transmit, to a remote service: (a) an indication of a performance metric, and (b) an indication of the plurality of groups; and receive, from the remote service, a selection of one device in each of the plurality of groups based, at least in part, upon the performance metric.

The remote service may be configured to select the one device in each of the plurality of groups based, at least in part, upon: a number of groups in the plurality of groups, a list of the plurality of devices, and a number of devices in each of the plurality of groups. The remote service may also be configured to select the one device in each of the plurality of groups based, at least in part, upon a value of each device in each of the plurality of groups, where each value is proportional to a number of features or quality of features of a respective device. The remote service may be further configured to select the one device in each of the plurality of groups based, at least in part, upon a weight of each device in each of the plurality of groups, where each weight reflects a measure of how a respective device affects the performance metric.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

In modern enterprises, the term "hoteling" (or "office hoteling"), shared workspaces, and co-working offices refer to physical environments where clients, users, or employees can schedule their hourly, daily, or weekly use of individual workspaces, such as office desks, cubicles, or conference rooms—thus serving as an alternative to permanently assigned seating. Generally, hoteling clients, users, or employees access a reservation system to book an individual workspace before they arrive at work, which gives them freedom and flexibility to work where they want to. In some cases, individual workspaces may also be available to users without a reservation system on a first-come, first-serve basis (e.g., in the lobby of a hotel).

Each individual workspace in a shared workspace may include its own set of peripheral devices. As used herein, the term "peripheral device" (or "peripheral") refers to any electronic device internally or externally coupled to an IHS and usable to transfer data to or from the IHS. Generally, information processed by an IHS can be input or output via a wide variety of peripherals devices, also known as I/O devices. Certain peripherals may be located inside an IHS's housing (i.e., integrated device), while others may be disposed outside the IHS's housing (i.e., external device).

Examples of peripheral devices include, but are not limited to: displays, Graphics Processing Units (GPUs), projectors, keyboards, mice, trackballs, touchpads, joysticks, graphics tablets, microphones, speakers, headsets, storage drives, cameras, scanners, printers, etc. Moreover, each peripheral device may be associated with a given one of a plurality of Operating System (OS) device classes. Examples of OS device classes include, but are not limited to: battery, biometric, BLUETOOTH (BT), camera, display, image, keyboard, monitor, mouse, media, printer, sensor, processor, Universal Serial Bus (USB), etc.

Each peripheral device may be coupled to an IHS via an I/O interface. A popular wired interface is the USB interface, which can also provide electrical power, plug-and-play, and hot swapping. Plug-and-play and hot swapping enable an OS to configure and discover a new peripheral device without having to restart its IHS. Conversely, a typical wireless interface is the BT interface, which is a short-range wireless technology standard used over short distances using UHF radio waves in the ISM bands, from 2.402 to 2.48 GHz. These two interfaces are discussed only for sake of illustration only, as there is a plethora of different peripheral device interfaces commercially available today.

When a client, user, or employee reaches an individual workspace, they bring their own IHS and use the peripheral devices assigned to or otherwise found in that workspace during a work session. In some implementations, each individual workspace may also include a docking station (or "dock") to which the IHS may be coupled during at least a portion of the session, and one or more peripherals may be indirectly connected to the user's IHS via the dock. In some cases, however, the client, user, or employee may choose to use one or more devices integrated into their IHS (e.g., integrated display, integrated GPU, integrated microphone, integrated speakers, integrated webcam, etc.), instead of a workspace peripheral device.

In most situations, external peripherals devices provide superior features and performance in comparison with integrated IHS peripherals. However, external peripherals cannot perform at optimal levels when the IHS's current performance is poor. For instance, external peripherals may perform worse than integrated peripherals depending upon the state of the IHS's battery (e.g., low Remaining State of Charge or "RSoC"), connectivity (e.g., low-quality BT/WiFi connection), system load (e.g., less CPU/RAM available), etc.

As an example, if an IHS is connected to an external 4K webcam via a USB-C dock, when using the webcam for a videoconferencing web client, the IHS's CPU utilization may reach a maximum and produce choppy video streams. In some cases, it may be more appropriate to to continue to use the 4K webcam and reduce the CPU load through other mechanisms. In other cases, however, a better solution may be to reduce the camera's resolution, or to use the integrated camera instead.

As another example, an IHS may be connected to a USB speaker and BT headset. When the IHS is working in battery or "DC" mode, it may be recommended to switch to BT headset for longer IHS battery time. As still another example, an IHS is connected to the external USB webcam, but the internal webcam may be currently used by a video conferencing application. If the IHS's thermal metrics are high, it may be recommended to switch to the external webcam for better overall performance. As yet another example, an IHS may be connected to a display via a wireless dock. If the network connection becomes degraded due to network congestion, increased latency, or reduced bandwidth, for instance, it may be recommended to switch to the integrated display.

As the number of peripheral devices proliferates, especially in hoteling workspaces, the inventors hereof have recognized that configuration challenges should be addressed for groups of peripheral devices available to an IHS at a given time, as opposed to each peripheral device individually, because of their cross-effects in IHS performance. In the absence of such a solution, users would have to manually and tentatively experiment with changed settings to reduce system load and/or to improve battery, thermal, and connectivity metrics.

To address these, and other problems, systems and methods described herein provide mechanisms for selecting and configuring grouped peripherals in shared workspaces. These systems and methods may identify, probe, calibrate (e.g., based on available telemetry data), and dynamically configure, select, or switch the collective use of peripheral devices among individual groups of devices (or "device classes") based upon current IHS metrics to improve performance and/or user experience. Although these systems and methods are particularly well-suited for hoteling environments, they may also be implemented in home or gaming scenarios.

Figure 1:
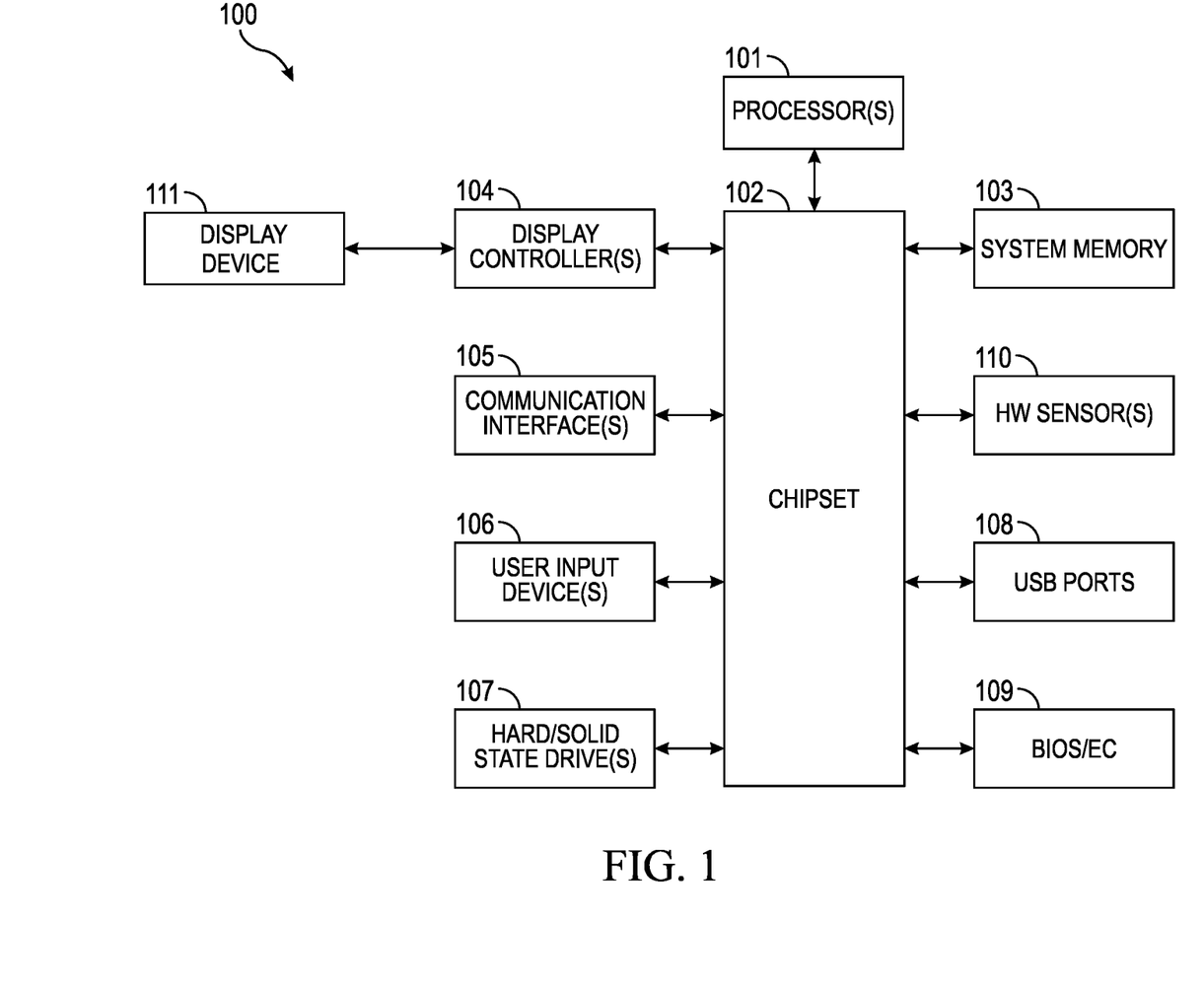
FIG. 1 is a block diagram of components of an example Information Handling System (IHS), according to some embodiments.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BT, cellular or mobile networks (e.g., Code-division multiple access or "CDMA," Time-division multiple access or "TDMA," Long-Term Evolution or "LTE," 5G, etc.), satellite networks, or the like. In some cases, communication interface(s) 105 may be coupled to chipset 102 via a PCIe bus.

Chipset 102 may be coupled to display controller(s) 104, which may include one or more or Graphics Processor Unit(s) (GPUs) on a graphics bus, such as an Accelerated Graphics Port (AGP) or Peripheral Component Interconnect Express (PCIe) bus. As shown, display controller(s) 104 provide video or display signals to display device(s) 111. In some cases, display controller(s) 104 may also include a touchscreen controller that enables a user to provide touch inputs (e.g., finger, pen, etc.) directly on the surface of display device(s) 111. In other implementations, any number of display controller(s) 104 or display device(s) 111 may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable a collaboration mode for a touchpad coupled or integrated into IHS 100.

Chipset 102 may also provide access to one or more hard disk and/or solid-state drives 107. In certain embodiments, chipset 102 may also provide access to one or more optical drives or other removable-media drives. In certain embodiments, chipset 102 may also provide access to one or more Universal Serial Bus (USB) ports 108.

Chipset 102 may further provide access to one or more user input devices 106, for example, using a super I/O controller or the like. Examples of user input devices 106 include, but are not limited to, a keyboard, mouse, touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. The BIOS provides an abstraction layer that allows the OS to interface with certain hardware components that are utilized by IHS 100. Via the hardware abstraction layer provided by the BIOS, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 109 may also implement operations for detecting certain changes to the physical configuration or posture of IHS 100 (e.g., laptop mode, tablet or book mode, etc.) and managing the modes of a touchpad or other user input device 106 in different configurations of IHS 100. For instance, where IHS 100 as a 2-in-1 (laptop/tablet) form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc.

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip (SoC). As such, in certain embodiments, IHS 100 may be implemented as different classes of computing devices including, but not limited to: servers, workstations, desktops, laptops, appliances, video game consoles, tablets, smartphones, etc.

Figure 2:
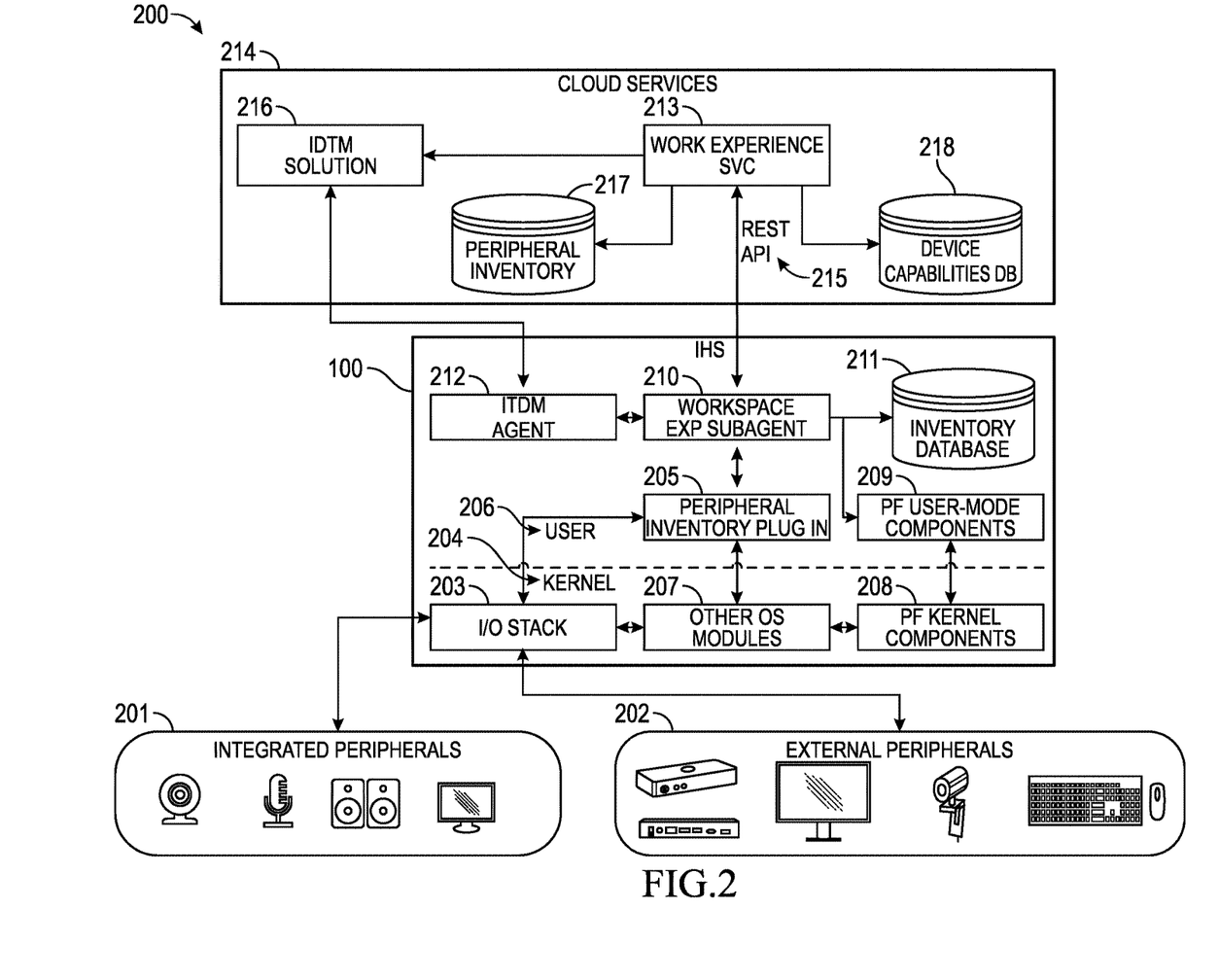
FIG. 2 is a block diagram of an example of a system for selecting and configuring grouped peripherals in shared workspaces, according to some embodiments.

FIG. 2 is a block diagram of an example of system 200 for selecting and configuring grouped peripherals in shared workspaces. In various embodiments, one or more elements of system 200 may be implemented by one or more components of IHS 100, and/or may be instantiated through the execution of program instructions (e.g., applications, OS services, firmware, etc.) by processor(s) 101.

Particularly, IHS 100 is coupled to a plurality of integrated 201 and external peripherals 202 (e.g., found in an individual workspace where IHS 100 is located) via I/O stack 203 of kernel space 204. I/O stack 203 is coupled to peripheral inventory plugin 205 of user space 206. In kernel space 204, other OS modules 207 are coupled to peripheral inventory plugin 205, and platform framework kernel components 208 are coupled to OS modules 207.

In user space 206, peripheral inventory plugin 205 is coupled to workspace experience subagent 210. Workspace experience subagent 210 is coupled to Information Technology Decision Maker (ITDM) agent 212, inventory database 211, and platform framework user-mode components 209. Platform framework user-mode components 209 is also coupled to platform framework kernel components 208.

ITDM agent 212 is in communication with ITDM solution 216 (e.g., INTUNE, WORKSPACE ONE, etc.) provided by remote or cloud services 214 via a network (e.g., the Internet), and workspace experience subagent 210 is coupled to workspace experience cloud service 213 via representational state transfer (REST) application programming interface (API) 215. Workspace experience cloud service 213 is further coupled to ITDM solution 216, peripheral inventory database 217, and device capabilities database 218.

In operation, peripheral inventory plugin 205 registers with the IHS's OS for peripheral connection and disconnection notifications. In addition, peripheral inventory plugin 205 is configured to identify internal and external devices belonging to a same device group (e.g., for webcam device group, it identifies an integrated webcam and an external webcam; if available).

A non-limiting example of a list of peripherals produced by peripheral inventory plugin 205 is shown in Table 1 below:

TABLE 1

Peripheral Inventory

| Device Name | Device ID | Bus Details | Device Group or Class |
| --- | --- | --- | --- |
| Integrated webcam | VID_1BCF&PID_28C4 | Internal (MIPI-CSI) | Camera-{ca3e7ab9-b4c3-4ae6} |
| External webcam | USB\VID_046D&PID_0870\5&EC | External (USB) | |
| Integrated audio | AUDIO\FUNC_01&VEN_10EC | Internal (USB) | Media (audio)-{4d36e96c-e325} |
| HandsFree audio | BTHENUM\{0000110b-0000} | External (BT LE) | |
| IHS monitor | MONITOR\AUO313D | Internal | Monitor-{4d36e96e-e325-11ce-bfc1} |
| External display | DISPLAY\DELA07B\4&13f6791b | External (DP/HDMI) | |
| Integrated keyboard | HID\VID 045E&UP:0001_U:0006 | Internal | Keyboard-{4d36e96b-e325-11df-khjrd} |

Workspace experience cloud service 213 analyses system telemetry data (e.g., IHS performance metrics or indicators) and recommends the selection, order of preference, and/or configuration parameters for one device in each device class to workspace experience subagent 210. Workspace experience subagent 210 works cooperatively with peripheral inventory plugin 205 and workspace experience cloud service 213 to implement various methods described herein, including method 300 of FIG. 3 and method 400 of FIG. 4.

Figure 3:
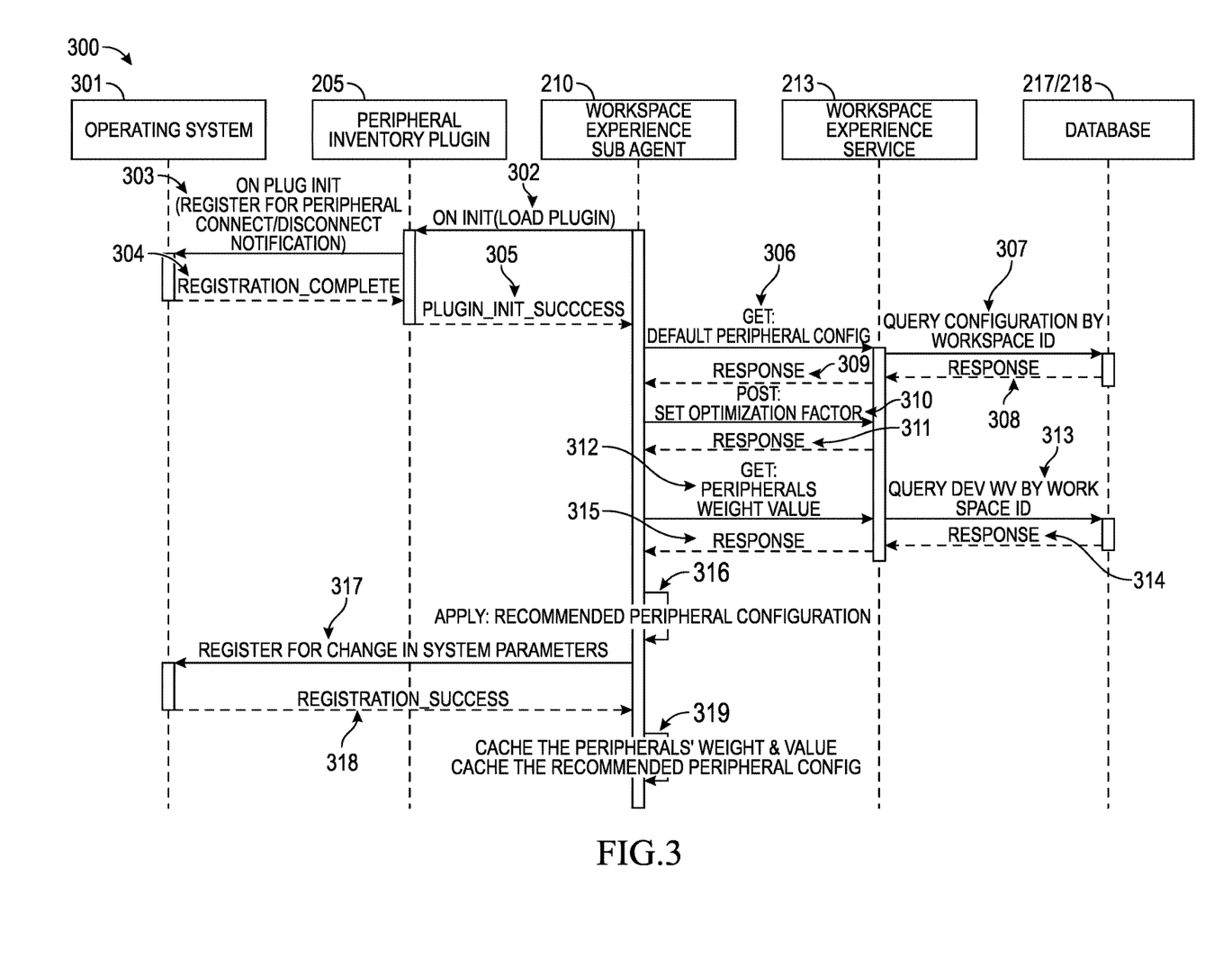
FIG. 3 is a flowchart of an example of a method for selecting and configuring an initial or default group of peripheral devices in a shared workspace, according to some embodiments.

Particularly, FIG. 3 is a flowchart of an example of method 300 for selecting and configuring an initial or default group of peripheral devices in a shared workspace. In various embodiments, method 300 may be performed, at least in part, by one or more components shown in system 200 of FIG. 2.

Upon its initialization, at 302 workspace experience subagent 210 loads peripheral inventory plugin 205. At 303, peripheral inventory plugin 205 registers itself with OS 301 (or EC 109) to receive peripheral device, workspace, dock, and/or access point (AP) connection and disconnection notifications, as well as IHS posture changes and IHS location changes. At 304, OS 301 indicates to peripheral inventory plugin 205 that its registration is complete, and at 305 peripheral inventory plugin 205 notifies workspace experience subagent 210 that its initialization has been successful. In operation, peripheral inventory plugin 205 may collect the types of information shown in Table 1 for peripheral devices and device classes available to IHS 100 (e.g., in an individual workspace).

After 305, workspace experience subagent 210 establishes a session with workspace experience cloud service 213. At 306, workspace experience subagent 210 sends a GET request to workspace experience cloud service 213 to retrieve an initial or default peripheral configuration recommendation. In response, at 307 workspace experience cloud service 213 queries database(s) 217/218. Database(s) 217/218 fulfill the request at 308, and at 309 workspace experience cloud service 213 forwards the initial or default peripheral configuration recommendation to workspace experience subagent 210.

A non-limiting example of an initial or default peripheral configuration recommendation, per device class, for a given workspace, as retrieved by workspace experience subagent 210, is shown in Table 2 below:

TABLE 2

Initial or Default Peripheral Selection

| Workspace | Device Group | Default/Recommended Peripherals |
| --- | --- | --- |
| Hybrid Cube 001 | Camera | External webcam |
| | Media | Integrated audio |
| | Display | Two (2) external monitors in spanning mode |

At 310, workspace experience subagent 210 sends a POST command to set an optimization factor with workspace experience cloud service 213 for selecting optimal peripherals across IHS 100, in the current workspace, for each peripheral device group or class (e.g., selecting peripherals based on system resource consumption, performance per Watt, performance per cost, etc.). At 311, workspace experience cloud service 213 responds to workspace experience subagent 210.

At 312, workspace experience subagent 210 sets a GET request to obtain peripheral device weights and values from workspace experience cloud service 213. Each weight reflects a measure of how a respective device affects the performance metric, and each value is proportional to the number of features (or quality of features) of a respective device, for example, based upon the optimization factor. At 316, workspace experience subagent 210 applies the recommended peripheral configuration received at 309 to IHS 100, for example, by disconnecting from a first peripheral device of a given device class and connecting to a second peripheral device of the same device class.

At 317, workspace experience subagent 210 registers with OS 301 to receive a notification of changes in IHS performance metrics (e.g., CPU usage>40%, RAM usage>70%, Battery RSoC<40%, power profile changes, network bandwidth or congestion, etc.). At 318, OS 301 indicates to workspace experience subagent 210 that its registration has been successful, and at 319 workspace experience subagent 210 caches the peripherals' weights and values, as well as the initial or default configuration settings, usable in subsequent operations (e.g., method 400 of FIG. 4).

Figure 4:
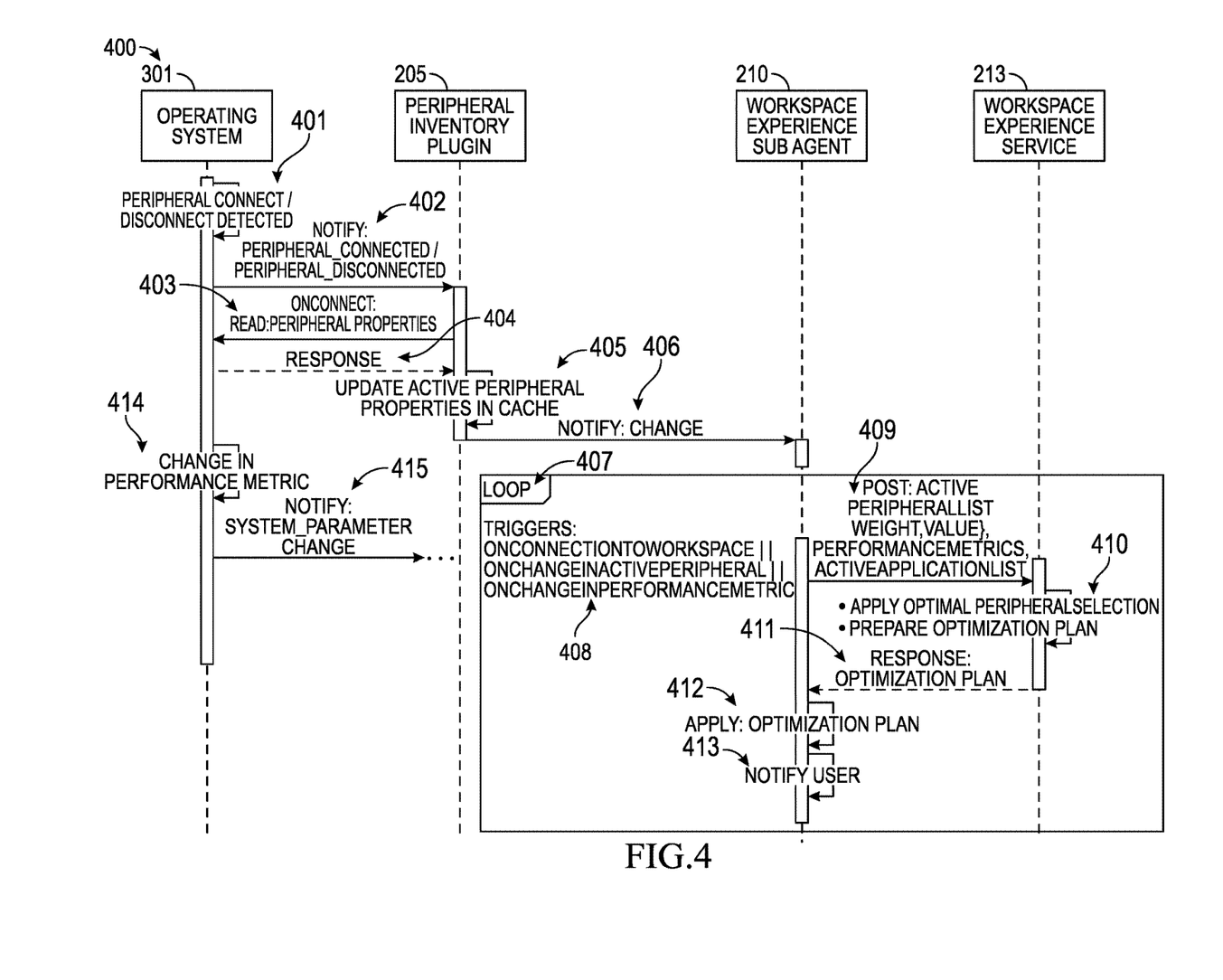
FIG. 4 is a flowchart of an example of a steady state method for dynamically selecting and configuring grouped peripherals in a shared workspace, according to some embodiments.

FIG. 4 is a flowchart of an example of steady state method 400 for dynamically selecting and configuring grouped peripherals in shared workspaces. In various embodiments, method 400 may be performed, at least in part, by one or more components shown in system 200 of FIG. 2, for example, upon competition of method 300 of FIG. 3.

At 401, OS 301 detects a peripheral device connection or disconnection from IHS 100. At 402, OS 301 notifies peripheral inventory plugin 205. In the case of a connection, at 403 peripheral inventory plugin 205 sends a message to OS 301 to obtain peripheral properties, and OS 301 responds at 404. At 405, peripheral inventory plugin 205 updates the properties of active peripherals of Table 1 stored in a cache or other memory, and at 406 peripheral inventory plugin 205 notifies workspace experience subagent 210 of the detected changes.

At 409, as part of loop 407, workspace experience subagent 210 may, in response to trigger 408, send a POST command to workspace experience cloud service 213 to update an active list of peripherals (including each device's weight and value, discussed in more detail below), IHS performance metrics, IHS posture, IHS location, workspace or AP identification, and/or active applications executed by IHS 100 (in the foreground and/or in the background). Moreover, for each active application, its consumption of IHS resources may also be provided (e.g., CPU %, RAM %, Power %, etc.).

A non-limiting example of a JSON file transmitted by workspace experience subagent 210 to workspace experience cloud service 213 at 409 is as follows:

```
"active peripherals":{
"$": [ {
"category":"camera",
"device":"Integrated webcam",
"device_group":"{ca3e7ab9-b4c3-4ae6}",
"device_id":"VID_1BCF&PID_28C4",
"weight":"3", // in the scale of 1 to 10
"value":"5", // in the scale of 1 to 10
}, {
"category":"camera",
"device":"External webcam",
"device_group":"{ca3e7ab9-b4c3-4ae6}",
"device_id":"USB\VID_046D&PID_0870\5&EC",
"weight":"6", // in the scale of 1 to 10
"value":"9", // in the scale of 1 to 10
}, {
"category":"Media (Audio)",
"device":"Integrated audio",
"device_group":"{4d36e96c-e325}",
"device_id":"AUDIO\\FUNC_01&VEN_10EC",
"weight":"2", // in the scale of 1 to 10
"value":"5", // in the scale of 1 to 10
}, {
"category":"Media (Audio)",
"device":"S7 HandsFree audio",
"device_group":"{4d36e96c-e325}",
"device_id":"BTHENUM\\{0000110b-0000}",
"weight":"7", // in the scale of 1 to 10
"value":"8", // in the scale of 1 to 10
} ] }
"current-system-parameters":{
"$": [ {
"resource":"CPU",
"description":"8650U @ 1.9GHz",
"utilization":"90", // in percentage
"processes":"414", // number of processes
}, {
"resource":"memory"
"description":"RAM",
"utilization":"80", // in percentage
"total-memory":"16", // in GB
"in-use":"13.2", // in GB
"available": "2.7" // in GB
} ] }
```

Examples of triggers 208 include, but are not limited to: a connection or disconnection to a new workspace (e.g., by dock ID, AP, physical location, etc.), a change in a peripheral device (connected or disconnected), a change in IHS posture (e.g., laptop or tablet mode) and/or a change in IHS performance metrics or other system parameters (e.g., an average metric, such as CPU utilization, battery level, or connectivity quality being above or below a selected threshold for a certain amount of time).

At 410, workspace experience cloud service 213 selects one peripheral from each group of peripherals and prepares an optimization plan. At 411, workspace experience service 213 transmits the optimization plan to workspace experience subagent 210. At 412, workspace experience subagent 210 applies the optimization plan, for example, by selecting or configuring one or more peripheral devices as outlined in the plan. Then, at 413, workspace experience subagent 210 may notify the user of the changes.

A non-limiting example of a JSON file representing an optimization plan produced by workspace experience cloud service 213 is as follows:

```
"optimization-plan":{ // Selected Optimal Peripherals
"$":[ {
"category":"camera",
"device":"Integrated webcam",
"device_group":"{ca3e7ab9-b4c3-4ae6]",
"device_id":"VID_1BCF&PID_28C4",
}, {
"category":"Media (Audio)",
"device":"Integrated audio",
"device_group":"{4d36e96c-e325}",
"device_id":"AUDIO\FUNC_01&VEN_10EC",
} ] }
```

In alternative implementations, at 410 workspace experience service 213 may prepare a set of two or more optimization plans, each plan having a different peripheral selection for one or more peripheral classes, the user may interact with workspace experience subagent 210 to select a plan among the set at 413, and application of a user-selected optimization plan at 412 may occur after 413. Moreover, when a change in IHS performance metric is detected by OS 301 at 414, OS 301 notifies peripheral inventory plugin 205 and loop 207 may be re-executed.

In various embodiments, at 410 workspace experience cloud service 213 may apply an optimal peripheral selection algorithm to select, for each device class, one peripheral device among integrated and external peripherals disposed in a workspace provides maximum value. Such value may be selected by a user or may be automatically selected by workspace experience cloud service 213 based on context. Examples include, but are not limited to: greater application performance, lesser battery discharge or power consumption, etc.

To apply an optimal peripheral selection algorithm, workspace experience cloud service 213 may calculate:

$$\max\{\Sigma_{i=1}^{n}\Sigma_{j=1}^{|G_i|}v_{ij}x_{ij}\} \quad (A)$$

Where n is a total number of peripheral groups or device classes, $G_i$ is the set of peripheral groups (a collective peripheral list), $|G_i|$ is the total number of peripherals in the peripheral group $G_i$, $v_{ij}$ is the value of a specific peripheral j in peripheral group $G_i$, and $x_{ij}$ is a binary value that indicates whether peripheral j in peripheral group $G_i$, is selected (e.g., 1) or rejected (e.g., 0).

Furthermore, Eq. A may be calculated with the following two constraints. First, only one peripheral is selected in each peripheral group, that is:

$$\Sigma_{j=1}^{|G_i|}x_{ij}=1 \quad (B)$$

Second, the maximum collective weight limit for all selected peripherals is kept smaller than or equal to C, the maximum collective weight limit of all selected peripherals for IHS 100 in a particular context, that is:

$$\sum_{i=1}^{n}\sum_{j=1}^{|G_i|} w_{ij} x_{ij} \leq C \tag{C}$$

Where wij is the weight of each peripheral j in peripheral group Gi.

A non-limiting example use-case of an optimization calculation is provided below:

TABLE 3

Example Use-Case

| Group | Device Name | Device ID | Bus Details | Power Weight (w) | Thermal Weight (w") | Value (v) | Selected? (x) |
|---|---|---|---|---|---|---|---|
| G1 - Camera | $G_{11}$ - Integrated webcam | VID_1BCF&PID_28C4 | Internal (MIPI-CSI) | $W'_{11} = 6$ | $W'_{11} = 7$ | $W'_{11} = 5$ | $X_{11} = 0$ |
| | $G_{12}$ - External webcam | USB\VID_046D&PID_0870\5&EC | External (USB) | $W'_{12} = 8$ | $W'_{12} = 2$ | $W'_{12} = 9$ | $X_{12} = 1$ |
| G2 - Media | $G_{21}$ - Integrated audio | AUDIO\FUNC_01 &VEN_10EC | Internal (USB) | $W'_{21} = 2$ | $W'_{21} = 5$ | $W'_{21} = 5$ | $X_{21} = 1$ |
| | $G_{22}$ - HandsFree Audio | BTHENUM\{0000110b- 0000} | External (BT LE) | $W'_{22} = 7$ | $W'_{22} = 1$ | $W'_{22} = 8$ | $X_{22} = 0$ |

In the scenario of Table 3, the total number of peripheral groups n is 2 (G={G1, G2}). The total number of peripherals in peripheral group |G1| is 2, and in |G2| it is also 2. The maximum collective power weight limit of the selected peripherals C' is 12, and the maximum collective thermal weight limit of the selected peripherals C" is 10. In this case, when computed to respect a maximum collective power weight C' of 12, peripherals $G_{12}$ and $G_{21}$ are selected in each group to provide a collective value of 14.

In alternative embodiments, an on-the-box telemetry agent may cache IHS and workspace parameters periodically, normalize them, and synchronize their values with workspace experience cloud service 213. Additionally, or alternatively, the optimization factor may be modified during the steady state by the user (via GUI) or by the ITDM. Additionally, or alternatively, workspace experience subagent 210 may employ machine learning (ML) to emphasize or de-emphasize the weight and value of a peripheral device based on feedback and/or telemetry data.

Additionally, or alternatively, optimization calculations may be based upon multiple factors in ratio (e.g., 70% by performance and 30% by power consumption). Additionally, or alternatively, workspace experience cloud service 213 may be implemented locally by IHS 100. Additionally, or alternatively, workspace experience cloud service 213 may be integrated with ITDM solution 216, and requests/responses may be relayed to workspace experience subagent 210 through ITDM agent 212.

In some cases, if multiple users of a same IHS model get the same recommendation for a given workspace, the specific workspace's default peripheral configuration of Table 2 may be updated dynamically with the latest recommendation (to ensure that the next user of same IHS type gets the latest optimized peripheral config for that workspace).

As such, systems and methods described herein may enable the dynamic configuration, selection, and switching of peripheral devices belonging to multiple device classes across different contexts to optimize for the overall workspace system performance as a group. These systems and methods may identify (one peripheral in each peripheral group), probe, calibrate (based on the available system telemetry data and/or IHS performance metrics) and dynamically configure, select, and switch peripherals across IHSs and workspaces based on current system parameters with the goal of providing an overall workspace optimization, as opposed to individual device optimization only.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
operate in a shared workspace, wherein the shared workspace comprises a physical environment having a plurality of peripheral devices, including an external camera device and an external display;
perform an inventory, including discovering the plurality of peripheral devices;
group the plurality of peripheral devices available in the shared workspace into a plurality of groups, including creating a first group including an integrated camera device and the external camera device and creating a second group including an integrated display and the external display;
transmit, to a remote service: (a) an indication of a performance metric, and (b) an indication of the plurality of groups; and
receive, from the remote service, a selection of one item in the first group and one item in the second group for use in the shared workspace based, at least in part, upon the performance metric.

2. The IHS of claim 1, wherein the plurality of peripheral devices further comprises at least one of: a set of two or more keyboards, a set of two or more mice, or a set of two or more audio devices.

3. The IHS of claim 1, wherein the plurality of peripheral devices comprises a first set of peripheral devices integrated into the IHS and a second set of external peripheral devices disposed in the shared workspace where the IHS is located.

4. The IHS of claim 3, wherein the shared workspace comprises a desk, cubicle, room, an office, or a home.

5. The IHS of claim 1, wherein each of the plurality of groups comprises two or more devices that belong to a same Operating System (OS) device class.

6. The IHS of claim 1, wherein the performance metric comprises at least one of:
a current processing load, a current memory load, a current battery level, a current power consumption, a current thermal characteristic, or a current connectivity metric.

7. The IHS of claim 1, wherein the remote service is configured to select the one item in the first group and the one item in the second group based, at least in part, upon: (i) a number of groups in the plurality of groups; (ii) a list of the plurality of peripheral devices; (iii) a number of peripheral devices in each of the plurality of groups; (iv) a value of each peripheral device in each of the plurality of groups; (v) a weight of each peripheral device in each of the plurality of groups; and (vii) a maximum collective weight limit for all selected peripheral devices.

8. The IHS of claim 7, wherein each weight reflects a measure of how a respective peripheral device affects the performance metric.

9. The IHS of claim 7, wherein each value is proportional to a number of features or quality of features of a respective peripheral device.

10. The IHS of claim 1, wherein the program instructions, upon execution, further cause the IHS to:
determine that the plurality of peripheral devices available in the shared workspace has changed;
transmit, to the remote service, an indication of the change; and
receive, from the remote service, a selection of at least one other item in at least one of the plurality of groups for use in the shared workspace based, at least in part, upon the change.

11. The IHS of claim 1, wherein the program instructions, upon execution, further cause the IHS to:
determine that the performance metric has changed;
transmit, to the remote service, an indication of the change; and receive, from the remote service, a selection of at least one other item in at least one of the plurality of groups for use in the shared workspace based, at least in part, upon the change.

12. The IHS of claim 1, wherein the program instructions, upon execution, further cause the IHS to:
determine that an application executed by the IHS in the shared workspace has changed;
transmit, to the remote service, an indication of the change; and
receive, from the remote service, a selection of at least one other item in at least one of the plurality of groups for use in the shared workspace based, at least in part, upon the change.

13. A method, comprising:
receiving, at a remote service from an Information Handling System (IHS), an indication of a current IHS performance metric and an indication of a plurality of groups of devices available to the IHS in a shared workspace, wherein the plurality of groups includes a first group having an integrated camera device and the external camera device and a second group having an integrated display and the external display; and
transmitting, from the remote service to the IHS, a selection of one device in the first group and one device in the second group for use in the shared workspace based, at least in part, upon the current IHS performance metric.

14. The method of claim 13, further comprising:
receiving, at the remote service from the IHS, an indication that a plurality of devices available in the shared workspace has changed; and
transmitting, from the remote service to the IHS, a selection of at least one other device in at least one of the plurality of groups for use in the shared workspace based, at least in part, upon the change.

15. The method of claim 13, further comprising:
receiving, at the remote service from the IHS, an indication that an application executed by the IHS in the shared workspace has changed; and
transmitting, from the remote service to the IHS, a selection of at least one other device in at least one of the plurality of groups for use in the shared workspace based, at least in part, upon the change.

16. The method of claim 13, further comprising:
receiving, at the remote service from the IHS, an indication that the IHS performance metric has changed; and
transmitting, from the remote service to the IHS, a selection of at least one other device in at least one of the plurality of groups for use in the shared workspace based, at least in part, upon the change.

17. A hardware memory device having program instructions stored thereon that, upon execution by a processor of an Information Handling System (IHS), cause the IHS to:
operate in a shared workspace, wherein the shared workspace comprises a physical environment having a plurality of peripheral devices, including an external camera device and an external display;
perform an inventory, including discovering the plurality of peripheral devices;
group the plurality of peripheral devices in the shared workspace into a plurality of groups, including creating a first group including an integrated camera device and the external camera device and creating a second group including an integrated display and the external display;
transmit, to a remote service: (a) an indication of a performance metric, and (b) an indication of the plurality of groups; and
receive, from the remote service, a selection of one item in the first group and one item in the second group based, at least in part, upon the performance metric.

18. The hardware memory device of claim 17, wherein the remote service is configured to select the one item in the first group and the one item in the second group based, at least in part, upon: a number of groups in the plurality of groups, a list of the plurality of peripheral devices, and a number of peripheral devices in each of the plurality of groups.

19. The hardware memory device of claim 17, wherein the remote service is configured to select the one item in the first group and the one item in the second group based, at least in part, upon a value of each peripheral device in each of the plurality of groups, wherein each value is proportional to a number of features or quality of features of a respective peripheral device.

20. The hardware memory device of claim 17, wherein the remote service is configured to select the one item in the first group and the one item in the second group based, at least in part, upon a weight of each peripheral device in each of the plurality of groups, wherein each weight reflects a measure of how a respective peripheral device affects the performance metric.

* * * * *